March 6, 1934.  C. B. McDONALD  1,949,613

VALVE SEAT RETAINER

Filed June 23, 1930

INVENTOR
Charles B. McDonald
BY
ATTORNEYS.

Patented Mar. 6, 1934

1,949,613

UNITED STATES PATENT OFFICE 1,949,613

VALVE SEAT RETAINER

Charles B. McDonald, Detroit, Mich., assignor to Wilcox-Rich Corporation, a corporation of Michigan Application June 23, 1930, Serial No. 463,081

12 Claims. (Cl. 123—188)

The general objects of the present invention being indicated by the above title, it may be understood that the present invention relates to the use of replaceable valve seats in engine cylinder blocks or head blocks, and to means and methods for securing the same,—the preferred means being indirect but inclusive of a metallic bond and optionally such as to permit of "floating" or other adjustment effects.

Much attention having recently been given to efforts to build up worn valve seats in cylinders and cylinder heads, in view of the rapid wear to which valve seats are frequently subjected in the high-speed motors now used upon trucks, tractors, busses and elsewhere, and the various wear-resistant and corrosion-resistant compositions which are suitable to use as valve seats having been found generally unsuitable to a direct union thereof, as by welding, with cylinder blocks or head blocks, the present invention contemplates the retention of annular valve seats by means obviating all necessity for a direct or permanent union thereof with said blocks; and preferred embodiments of the invention, as applied to the securing of special replaceable annular seat elements in valve openings, contemplate not only the provision of grooves for the reception of said seats but a welding of special retainers in said grooves.

Each retainer may have the form of an annulus adapted to extend partially over an annular seat element and formed of a material (such as cast iron in case the engine block is formed from cast iron) suitable for a welding or like metallic union with the block receiving the same.

Other objects of the present invention, all forms of which may utilize the recognized principle that two parts formed from substantially identical material (and therefore having substantially the same coefficient of expansion and other properties) may be securely united by a metallic bond (said invention including not only mentioned annuli but engines equipped therewith, and also special means and methods of obtaining and using elements and products mentioned) may be best appreciated from the following description of illustrative embodiments of the invention, taken in connection with the appended claims and the accompanying drawing.

Figure 1:
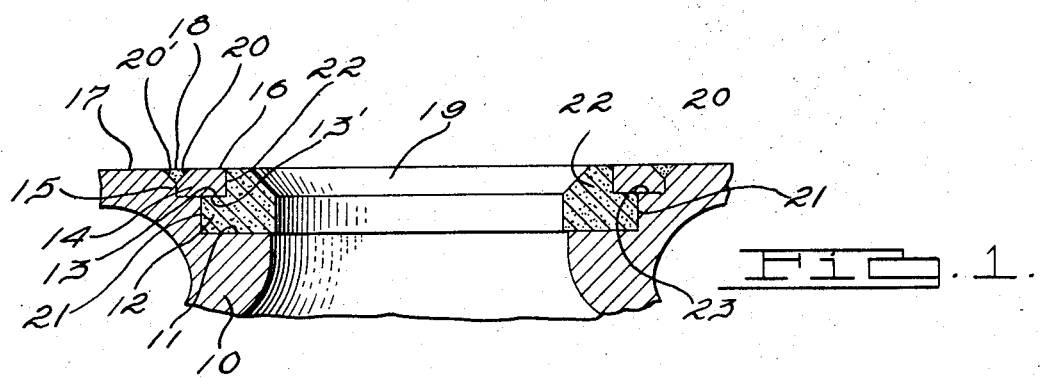
Fig. 1 is a sectional and diagrammatic fragmentary or detail view through a part of a cylinder block or a head block and through a seat provided in an opening therein,—parts being broken away.
Figure 2:
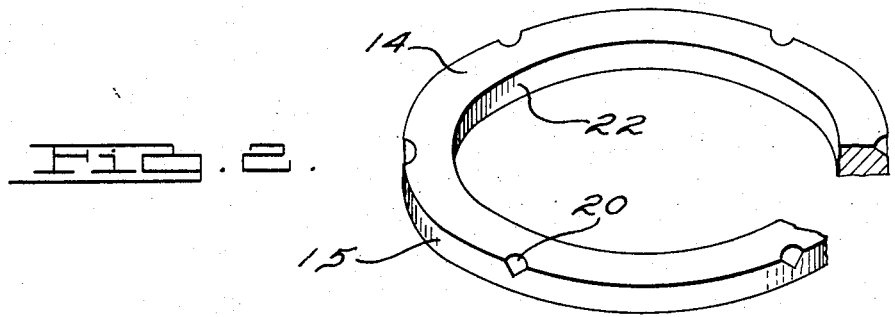
Fig. 2 is a perspective view showing one form of annular retaining element suitable for use in such an organization as that illustrated in Fig. 1.

The nature of the present invention being such as to require no general view, Fig. 1 will be understood to show a fragment of an engine block 10, such as a cylinder block or a head block, provided with an annular groove 11, for the reception of a replaceable seat element 12,—which may be formed from any special bronze or steel or other alloy known to be, or hereafter found to be, suitable, by reason of its resistance to wear and to corrosion, to withstand the rigorous conditions of its indicated use; and the seat element 12 will be seen to be provided with a groove defining a peripheral inclined or flat surface or shoulder 13, adapted to cooperate with a special retaining element in the form of an annular ring 14. This may provide a surface 13' opposable to the mentioned surface 13, in addition to an outer and presumably cylindrical surface 15 and an upper or exposed surface 16,—the latter being shown as flush with a flat surface 17 of the block 10.

No efforts being ordinarily made positively to unite the seat annulus 12 to either the block 10 or the retaining ring 14, these last-mentioned elements are herein intended to be formed from substantially identical material, which may ordinarily be cast iron in order that they may be easily, reliably and permanently united,—as by welding, at a plurality of spots 18. The ring 14 may be either split or entire; and it may have an outside diameter either equal to or greater than that of the seat annulus 12,—shown as provided with a conical valve-receiving face 19 and as substantially rectangular in cross sectional outline.

In order to facilitate welding operations, each ring 14 is optionally provided with a series of ground or other "nicks" 20, formed in casting the ring or subsequently adapted to be brought into rotative coincidence with similar nicks 20', if the latter are provided at the edge of any one-step or two-step groove to receive the same in the block 10; and the dimensions of the seat annulus 12 may be such, in relation to the groove 11 and the ring 14, as either to permit the seat 12 to "float" or rigidly to retain the same, appreciable clearances at 21 and 22 being unnecessary in case all parts are mechanically perfect and subject to no distortion or unequal wear.

Figure 3:
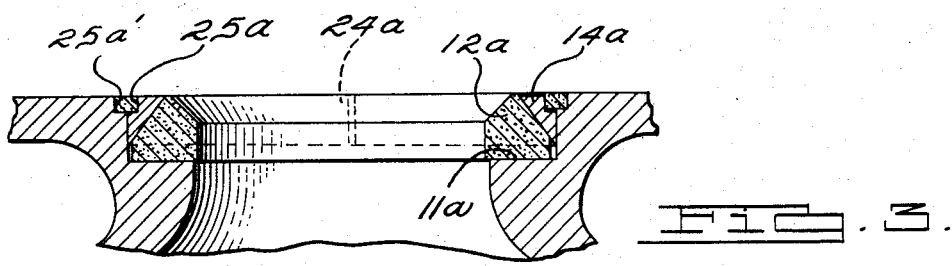
Figs. 3 and 4 are respectively views similar to Figs. 1 and 2, but showing an alternative form of seat ring and an alternative form of retaining ring.
Figure 4:
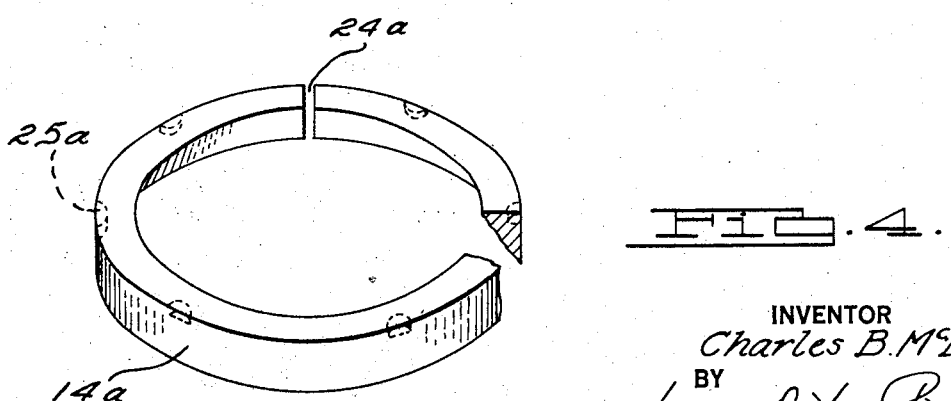

Fig. 3 will be seen to suggest the use of a groove 11a including no special "step", such as that shown at 23 in Fig. 1, for the reception of a retaining ring,—the ring 14a being triangular in section and being capable of interfitting in the manner of a wedge between the valve seat element and the block 10a; and Fig. 4 will be seen to suggest, in order to obviate all necessity for great precision in the forming of either ring 12a or ring 14a, the provision of a split at 24a in the latter ring.

Although the foregoing description has included complete details of but two embodiments of the present invention, it will be understood that such features as the provision of cooperating semi-cylindrical drilled nicks 25a, 25a', or the like, in the retaining ring and in the engine block (and either before or during installation of valve seats) are applicable to either or any embodiment of the present invention; and that unequal depression of opposite sides of a ring 14a may serve for a positive seat-adjusting effect if desired. Welding may be effected with a "matched" valve element in a pressure applying relationship to each seat; but it will be understood also that this is optional and that numerous modifications, additional to any suggested herein, might easily be devised by skilled workers, if informed of the foregoing,—all without departure from the scope of the present invention, as the latter is indicated above and in the following claims.

What I claim is:

1. In an internal combustion engine: an engine block provided with a valve opening surrounded by a groove suitable to receive a replaceable valve seat element; an annular seat element of hardened material in said groove; and a retaining element formed from substantially the same material as said block overlying said seat element, for retaining said seat element in said groove, the material of the seat element having a different coefficient of expansion from the material of the block and retaining element.

2. In an internal combustion engine: an engine block provided with a valve opening surrounded by a groove suitable to receive a replaceable valve seat element; an annular seat element of heat and wear resisting material in said groove; an overlying retaining ring formed from substantially the same material as said block, for retaining said seat element in said groove, the material of said seat element having a different coefficient of expansion from the material of the block and retaining element.

3. In an internal combustion engine: an engine block provided with a valve opening surrounded by a groove suitable to receive a replaceable valve seat element; an annular seat element of heat and wear resisting material in said groove and an overlying retaining ring received in said groove, said ring being formed from a material having the same coefficient of expansion as the engine block for retaining said seat element in said groove, the seat element having a different coefficient of expansion from that of the retaining member and the block.

4. In an internal combustion engine: an engine block provided with a valve opening surrounded by a groove suitable to receive a replaceable valve seat element; an annular seat element of heat and wear resisting material in said groove; and an element formed from a material having the same coefficient of expansion as the material of the block, for retaining said seat element in said groove,—said retaining element having the form of an annulus partially overlying said seat, the seat element having a different coefficient of expansion from the retaining member and the block.

5. In an internal combustion engine: an engine block provided with a valve opening surrounded by a groove suitable to receive a replaceable valve seat element; an annular seat element in said groove; and means, including an element formed from substantially the same material as said block, for retaining said seat element in said groove,—said retaining means being secured in said groove by a metallic union at the periphery thereof.

6. In an internal combustion engine: an engine block provided with a valve opening suitable to receive a replaceable valve seat element; an annular seat element; and means, including an element formed from substantially the same material as said block, for retaining said seat element in a desired relationship to said opening,—said block and said retaining element being united by a metallic bond.

7. For use in securing a valve seat element in a groove in an engine block: an annular retaining element shaped to interfit within said groove and partially to overlie said seat element and provided with means to facilitate the securing thereof only to the engine block by welding.

8. In the provision of a valve seat in an engine block, a method which comprises: providing a groove about a valve opening therein; disposing a valve seat annulus in said groove; disposing on said annulus and within said groove a retainer whose composition resembles that of said block; and uniting said retainer by a metallic bond to said block.

9. In the provision of a valve seat in an engine block, a method which comprises: providing a groove about a valve opening therein; disposing a valve seat annulus in said groove; disposing on said annulus and within said groove a retainer whose composition resembles that of said block; and uniting said retainer by a metallic bond to said block while so held as to effect a desired adjustment of said seat annulus.

10. In an internal combustion engine: an engine block provided with a valve opening suitable to receive a replaceable valve seat element; an annular seat element; and means united only with the engine block by welding to retain said seat element in the valve opening.

11. In an internal combustion engine: an engine block provided with a valve opening suitable to receive a replaceable valve seat element; an annular seat element; and means for positively retaining said seat element in position,—said means including a retainer formed from substantially the same material as said block and having a metallic bond thereto.

12. A valve seat ring for an engine block including a retaining portion having substantially the coefficient of expansion of the block and a seat portion formed of a material having heat resisting characteristics having a different coefficient of expansion from that of the engine block and retaining portion.

CHARLES B. McDONALD.